Feb. 21, 1961 W. H. DEVONSHIRE ET AL 2,972,223
JOINER LINK ASSEMBLY
Filed July 18, 1957

INVENTORS
WILLIAM H. DEVONSHIRE
FRANZ STONE
BY CHARLES J. MANNEY

Beau, Brooks, Buckley & Beau.
ATTORNEYS

United States Patent Office 2,972,223
Patented Feb. 21, 1961

2,972,223
JOINER LINK ASSEMBLY

William H. Devonshire, Williamsville, Franz Stone, East Aurora, and Charles J. Manney, Kenmore, N.Y., assignors to Columbus McKinnon Chain Corporation, Tonawanda, N.Y.

Filed July 18, 1957, Ser. No. 672,626

2 Claims. (Cl. 59—88)

This invention relates generally to an assembly for joining together lengths of chain, and for like purposes, and pertains more particularly to an improved joiner link assembly characterized by its convenience in assembly while at the same time lending itself readily to economy of manufacture.

This application is a continuation-in-part of copending application, Serial No. 597,725 filed July 13, 1956 for Joiner Link Assembly, now abandoned, which in turn is a continuation-in-part of abandoned application, Serial No. 498,127, filed March 31, 1955 for Chain Sling Device.

Joiner links are useful for many applications, but the usefulness of such devices is directly related to the ease and rapidity with which they may be applied with the tools which may be readily at hand, for it is often found that the need for using a joiner link occurs suddenly and in locations where tools are not ordinarily readily available, and to their ability to withstand the abuse normally encountered in service. That is, the need for a joiner link frequently arises due to breakage of existing equipment, such as a chain, and, unfortunately, such breakages usually occur at remote points removed from a normal source of tools, so that the ability of a joiner link assembly to be easily assembled with the aid of only those tools which are usually available becomes of paramount importance. It is therefore a primary object of this invention to provide an improved form of joiner link assembly which is chiefly characterized by its ability to be easily assembled by any means which will usually be available, and in this connection, it is to be noted that a wrench, hammer, stone or any suitable object for striking a blow is all that is required for assembling the joiner link constructed in accordance with this invention.

In addition, it is another object of this invention to provide in a joiner link assembly having the aforesaid characteristic, a collar or sleeve adapted to receive a joining pin and especially designed to withstand the maximum abuse normally expected to be encountered in service without loosening of the pin.

A further object of this invention resides in the provision of an improved form of joiner link assembly incorporating a pair of identical generally U-shaped link members terminating in open end portions which are easily interdigitated and secured together by means of a pin and associated locking collar, the collar or sleeve being located between the interdigitated open ends of the links and being formed of relatively soft material so as to be cooperable with enlarged spline-like portions in the center of the pin to securely lock the pin in place and requiring only that the pin be axially driven through the collar or sleeve until the fluted or splined portions thereof are firmly embedded therein.

Still another object of this invention is to provide, in combination with a pair of similar joiner links, a pin member cooperable therewith to join the same together and also cooperable with a collar or sleeve formed of relatively soft material in which the pin is characterized by being provided in its central portion with a plurality of circumferentially spaced sharp edged projections for embedment within the material of the collar or sleeve and further characterized by the pin being heat treated to not only retain substantially the original shape and form of the projections after embedment in the collar so as to achieve a good locking action therewith, but also to produce a pin member having relatively smaller diameter than the diameter of the links themselves which will be capable of withstanding those shearing and bending forces to which it will be subjected within the limits and capabilities of the joiner link members themselves.

These together with other objects and advantages which will become subsequently apparent reside in the details of construction as more fully hereinafter described and claimed, reference being had to the accompanying drawings forming a part hereof, wherein like numerals refer to like parts throughout, and in which:

Figure 1:
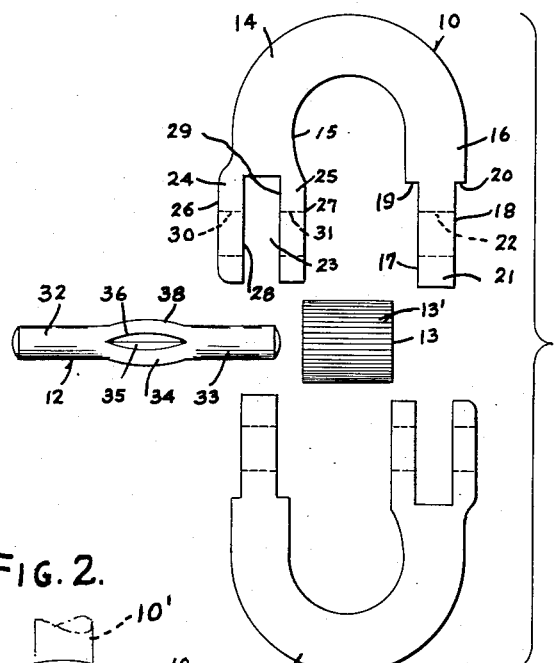
Figure 1 is an exploded elevational view showing the component parts of a joiner link assemblage.

Referring now more particularly to the drawings, Figure 1 illustrates the component parts of the assemblage which will be seen to include a pair of similarly formed half links 10 and 11, a joining pin 12 and a locking sleeve or collar 13. The two half links are of similar construction, and the following description of one is deemed to be sufficient for purposes of illustration.

As seen in Figure 1, the half link 10 is of generally U-shaped configuration embodying the arcuate bight portion 14 and the spaced, substantially parallel legs 15 and 16. Preferably, the bight portion 14 and those portions of the legs 15 and 16 immediately adjacent thereto are of circular configuration in cross-section, and it is also preferred that each of the half links be formed by a forging process with the end portions of their legs being subsequently machined to the proper dimensions, as will be hereinafter described.

One of the legs 16 is machined such that its opposite side faces 17 and 18 are flat and substantially parallel to each other and reduced to a thickness less than the immediately adjoining portion of the leg 16 so as to define the shoulder portions 19 and 20. Thus, the terminal portion of the leg 16 is defined by a relatively flat nose or projection which is preferably rounded at its free end 21 and which is provided substantially medially therethrough with a transverse bore, as indicated by the reference character 22.

The other leg 15 is provided with an enlarged end portion having an axially inwardly extending notch 23 defining the spaced, substantially parallel feet 24 and 25. The outer sides 26 and 27 of these feet are flat, the latter being machined, and substantially parallel to the faces 17 and 18 of the terminal portion of the other leg 16 and the inner opposed faces 28 and 29 of these feet are spaced apart a distance slightly greater than the thickness of the terminal nose portion of the other leg 16 so that the nose portion of the lower half link member 11 shown in Figure 1 may be readily inserted between these feet 24 and 25 when the parts are to be assembled.

Both of the feet 24 and 25 are provided with transverse bores 30 and 31 which are axially aligned with each other and with the previously mentioned transverse bore 22 extending through the nose-like terminal portion of the other leg member 16.

Figure 2:
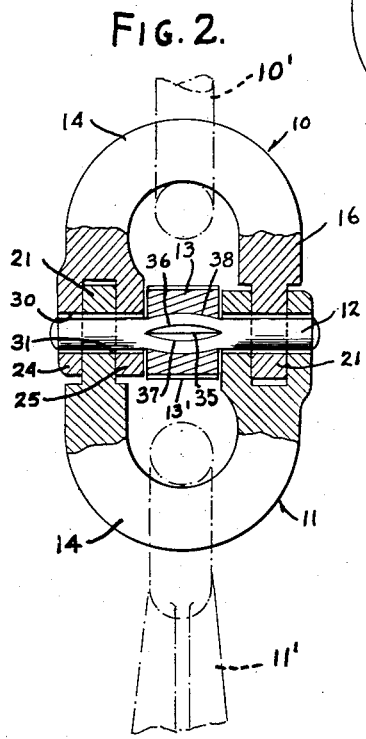
Figure 2 is an elevational view partly in section showing the improved joiner link assembly in the assembled position and joining together conventional parts with which it may be related.

The locking sleeve or collar 13 is preferably of cylindrical configuration, and is provided with a longitudinal bore therethrough, see particularly Figure 2. The longitudinal bore through this locking collar or sleeve is of a diameter such as to slidably or freely receive the opposite end portions 32 and 33 of this locking pin 12, which opposite end portions of the pin are of substantially equal and uniform diameter. However, the central portion 34 of the pin is provided with a plurality of circumferentially spaced and longitudinally extending flutes 35. These flutes are preferably formed in the manner shown in Figure 1, wherein they are of generally elliptical configuration extending longitudinally along the pin 12 and with the depth of such flutes decreasing from the centers thereof toward the opposite ends. These flutes are provided by radially inward penetration of a suitably formed tool into the surface of the pin such that the arrises 36 and 37 bounding each such groove or flute are raised outwardly of the remaining surface portions of the pins in the opposite end portions 32 and 33 thereof with such arrises being at their greatest height or radially outward projection in the central portion thereof and gradually tapering inwardly therefrom towards the opposite ends of such arrises, as is clearly illustrated by the silhouette 38 in Figure 1. This is of extreme importance not only in connection with ease of assembling the component parts, but also in achieving a suitable ultimate locking action between the pin 12 and the locking collar 13.

The locking sleeve or collar 13 is preferably formed of some soft material, such as mild steel so as to permit the projecting arrises of the pin to be readily embedded therein, while at the same time the hardness of the pin in cooperation with the relatively soft collar 13 will obviate any appreciable deformation of the pin itself so as to ultimately achieve the best locking action between the pin and collar. The elliptical configuration of the grooves or flutes 35 and their formation such as to be shallowest at their opposite ends and deepest in the central portions thereof, so as to provide the gradual bulging of the arrises 36 and 37 toward the center of the pin, permits the pin to be easily started into the collar bore so as to progressively cut deeper into and expand the surrounding surface of the collar as the pin is axially driven therethrough. This gradual bulging of the pin also serves to permit a relatively light driving force of the pin to properly cut into and expand the bore of the locking collar while at the same time achieving a good interference fit therebetween.

Figure 3:
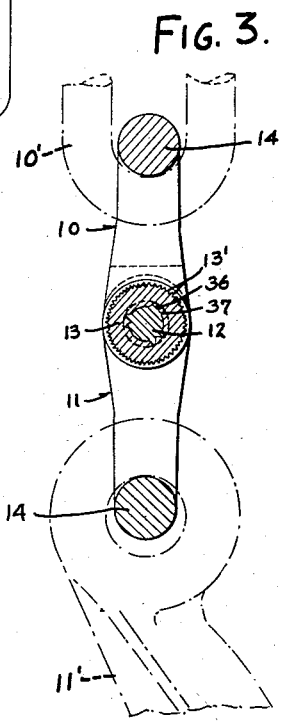
Figure 3 is a vertical section taken through the assembly shown in Figure 2.

The parts, as assembled, are clearly illustrated in Figure 2, and it will be noted therein that the bores through the free end portions of the half links 10 and 11 are large enough to freely pass the bulged central portion of the pin. In Figures 2 and 3, the joiner link is illustrated as joining the end 10' of a length of chain to a conventional hook member 11', but it is to be realized that the joiner links may be utilized to join any two desired members together and may be used to advantage in joining a broken chain or the like together.

In addition, it has been found that the locking sleeve or collar 13, comprising a spacer member positioned between feet 25, is subject to considerable abuse in service and that separation of pin 12 from collar 13 might occur as a result thereof. The spacer 13 is inclined to stretch under the impact of blows, particularly from the parts connected by the joiner link assembly as illustrated in phantom in Fig. 2, and such stretching can extend to a point where pin 12 becomes loosened from sleeve 13 and falls out of the assembly. This results in disassembly, or at least malfunctioning, of the joiner link.

To prevent this undesirable result, sleeve 13 is provided with means for absorbing the energy of blows received thereby in service, such means comprising a knurled outer surface therefor as indicated at 13'. Thus, in the illustrated embodiment the outer surface of sleeve 13 is straight knurled for its entire length, and the knurls 13' absorb the energy of blows received in service in a manner preventing peening and stretching of spacing sleeve 13, at least to an extent preventing separation of pin 12 therefrom.

Therefore, knurls 13' protect and maintain the interlock between pin 12 and spacer sleeve 13 against service abuse, by absorbing the energy of blows on sleeve 13 which otherwise might stretch the same to a point enabling pin 12 to fall out.

While only a presently preferred embodiment of our invention is disclosed in detail herein, it will be appreciated that we do not thereby intend to limit the scope of our invention, which is defined by the appended claims.

Having fully disclosed and completely described our invention, together with its mode of operation, what we claim as new is as follows:

1. In a joiner link assembly, a pair of generally U-shaped half links having interdigitated ends formed with alined bores therethrough, a pin and sleeve assembly for pivotally interlocking said half links, said sleeve bridging said link ends and being formed of a relatively soft material compared to the material of which said pin is formed, said sleeve having a bore extending longitudinally therethrough in alinement with said link end bores, said pin having a longitudinally extending central portion of lesser diameter than said link end bores and of greater diameter than the bore of said sleeve and being of progressively greater diameter toward the center of said central portion, whereby to permit said pin to be driven through said sleeve with the central portion thereof projecting into and interfering with the bore of said sleeve while permitting such interference to be achieved progressively, and said sleeve having a knurled outer surface to absorb the energy of blows thereon in service which otherwise might stretch said sleeve to a point causing said pin to become loosened therefrom.

2. A joiner link comprising a pair of substantially similar and generally U-shaped half links having interdigitated free end portions provided with axially aligned bores therethrough, a generally cylindrical locking sleeve bridging the interdigitated ends of said half links and provided with a longitudinal bore aligned with said first mentioned bores, and a locking pin projecting substantially completely through said bores, said pin having its opposite ends surrounded by the end portions of said half links and formed of substantially uniform and identical diameters, said pin having a central portion joining said opposite ends with the diametral dimensions of said central portion being greater than the diameter of said ends, said central portion of said pin having a plurality of circumferentially spaced and longitudinally extending grooves therein with each of said grooves projecting radially inwardly of said pin and being of greatest depth at the center thereof and progressively shallower toward the opposite ends of the groove, whereby the arrises defining such grooves are bulged outwardly beyond the end diameters of said pin progressively toward the center thereof, said bore through said sleeve being of a diameter slightly greater than that of the ends of said pin but less than that of the central portion thereof to provide a gradually increasing interference fit between said pin and sleeve as the central portion of said pin is driven into said sleeve, and the external surface of said sleeve being straight knurled throughout substantially the entire length thereof to absorb the energy of blows thereon in service such as otherwise might stretch said sleeve and result in loosening of said pin therefrom.

References Cited in the file of this patent
UNITED STATES PATENTS

| | | |
|---|---|---|
| 979,140 | Evans | Dec. 20, 1910 |
| 1,157,666 | Bennett | Oct. 26, 1915 |
| 1,513,729 | Adams | Nov. 4, 1924 |
| 1,804,701 | Mojonnier | May 12, 1931 |
| 2,135,322 | Brantingson | Nov. 1, 1938 |
| 2,642,242 | Karitzky | June 16, 1953 |